(12) United States Patent
Shibata

(10) Patent No.: US 6,290,157 B1
(45) Date of Patent: Sep. 18, 2001

(54) FISHING REEL

(75) Inventor: Takashi Shibata, Higashimurayama (JP)

(73) Assignee: Daiwa Seiko, Inc., Higashikurume (JP)

( * ) Notice: Subject to any disclaimer, the term of this patent is extended or adjusted under 35 U.S.C. 154(b) by 0 days.

(21) Appl. No.: 09/427,764

(22) Filed: Oct. 27, 1999

(30) Foreign Application Priority Data

Oct. 28, 1998 (JP) .................................................. 10-307125
Oct. 28, 1998 (JP) .................................................. 10-307126

(51) Int. Cl.$^7$ .................................................. A01K 89/01
(52) U.S. Cl. .......................................................... 242/241
(58) Field of Search ...................................... 242/241, 242

(56) References Cited

U.S. PATENT DOCUMENTS

| | | | |
|---|---|---|---|
| 5,564,639 | * 10/1996 | Yamaguchi | 242/241 |
| 5,678,780 | * 10/1997 | Hitomi | 242/241 |
| 5,722,609 | * 3/1998 | Murakami | 242/241 |
| 5,775,612 | * 7/1998 | Hashimoto | 242/241 |
| 5,934,586 | * 8/1999 | Kang et al. | 242/241 |

* cited by examiner

Primary Examiner—Katherine A. Matecki
(74) Attorney, Agent, or Firm—Oblon, Spivak, McClelland, Maier & Neustadt, P.C.

(57) ABSTRACT

The fishing reel of the present invention includes a reel main body equipped with a rotatable handle, a spool supported by the reel main body, for winding a fishing line therearound, an oscillating mechanism provided in the real main body, and having a traverse cam shaft which rotates as it cooperates with the handle, and has a circumferential surface in which a spiral cam groove is formed, and a slider member containing and supporting an engagement pin which engages with the cam groove of the traverse cam shaft, so as to move back and forth along an axial direction of the traverse cam shaft, said oscillating mechanism winding the fishing line on the spool in parallel by converting the rotating movement of the handle into a back-and-forth motion via the slider member, an opposing section formed to be integrated with the slider member, which opposes a part of an entire circumference of the traverse cam shaft, and a drop-off stopper support unit formed to be integrated with the opposing section, for supporting the engagement pin between the slider member and the traverse cam shaft so as to prevent it from being pulled out.

4 Claims, 7 Drawing Sheets

FISHING REEL

BACKGROUND OF THE INVENTION

The present invention relates to a fishing reel having an oscillating mechanism which moves a spool shaft forwards and backwards to wind a fish line uniformly around the spool without being one-sided.

An oscillating mechanism of this type has a sliding member which is fixed to a rear end of the spool shaft, and is made movable forwards and backwards along the traverse cam shaft, as disclosed in, for example, Jpn. Pat. Appln. KOKAI Publication No. 8-131029 or Japanese Utility Model Registration No. 3039903. With regard to this mechanism, the rotation movement of the handle is converted into a linear motion so as to move the spool forwards and backwards along with the spool shaft, and thus the fish line can be wound around the spool evenly without being one-sided.

In the sliding member 12, an engagement pin which is engageable with the traverse cam shaft is contained to be supported. The engagement pin is constituted by a proximal portion contained in the sliding member and an engagement section which engages with the traverse cam shaft. The outer diameter of the proximal portion is generally made approximately equal to the width of the engagement section; however in the case where the proximal portion is made to include a bearing (collar), the outer diameter of the proximal portion becomes larger than the width of the engagement section.

In such an oscillating mechanism, the engagement pin which engages with the traverse cam shaft is supported by a support hole of the slider member while it is held by a stopper plate to hold it from being pulled out. With this structure, a conventional oscillating mechanism requires such a stopper slate in addition to the slider member and engagement pin, and therefore the number of parts is increased. Further, with this structure, it becomes necessary to carry out a separate assembly process for holding the engagement pin from being pulled out, which not only decreases the assemble but also increases the production cost.

In the meantime, in order to improve the rotatability of the traverse cam shaft and the slidability of the engagement pin, for the purpose of improving the operability of the oscillating mechanism, it is possible to apply a technique in which, for example, the outer diameter of the traverse cam shaft is increased, and the width of the engagement section of the engagement pin is accordingly increased, so as to increase the engagement amount between the engagement pin and traverse cam shaft. However, in the above-described conventional oscillating mechanism, the outer diameter of the proximal portion of the engagement pin is made substantially equal to or larger than the width of the engagement section, in terms of ratio, and therefore the following problem is likely to occur if the above-described technique is applied.

More specifically, when the width of the engagement section is increased in accordance with the outer diameter of the traverse cam shaft, the outer diameter of the proximal portion is increased accordingly. Therefore, the slider member which contains the proximal portion must inevitably be increased in its entire size in order to maintain the mechanical strength and durability. Thus, if the size of the entire slider member is increased, the size of the entire oscillating mechanism is increased, and as a result, the reel as a whole is enlarged in size.

BRIEF SUMMARY OF THE INVENTION

The first object of the present invention is to provide a fishing reel having an oscillating mechanism of a low cost, which includes a less number of parts and has an excellent assemble processability. Further, the second object of the invention is to provide a fishing reel having an oscillating mechanism of an improved operability achieved by increasing the engagement amount between the engagement pin and the traverse cam shaft, and capable of downsizing the reel as a whole.

The object of the present invention can be achieved by the following fishing reel. That is, the fishing reel of the present invention comprises: a reel main body equipped with a rotatable handle; a spool supported by the reel main body, for winding a fishing line therearound; an oscillating mechanism having a traverse cam shaft which rotates as it cooperates with the handle, and has a circumferential surface in which a spiral cam groove is formed, and a slider member containing and supporting an engagement pin which engages with the cam groove of the traverse cam shaft, so as to move back and forth along an axial direction of the traverse cam shaft, the oscillating mechanism winding the fishing line on the spool in parallel by converting the rotating movement of the handle into a back and forth motion via the slider member; an opposing section formed to be integrated with the slider member, which opposes a part of an entire circumference of the traverse cam shaft; and a stopper support unit formed to be integrated with the opposing section, for supporting the engagement pin between the slider member and the traverse cam shaft so that it will not be pulled out.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings. Each of the following embodiments will be explained in connection with a case of fishing spinning reel.

Figure 1:
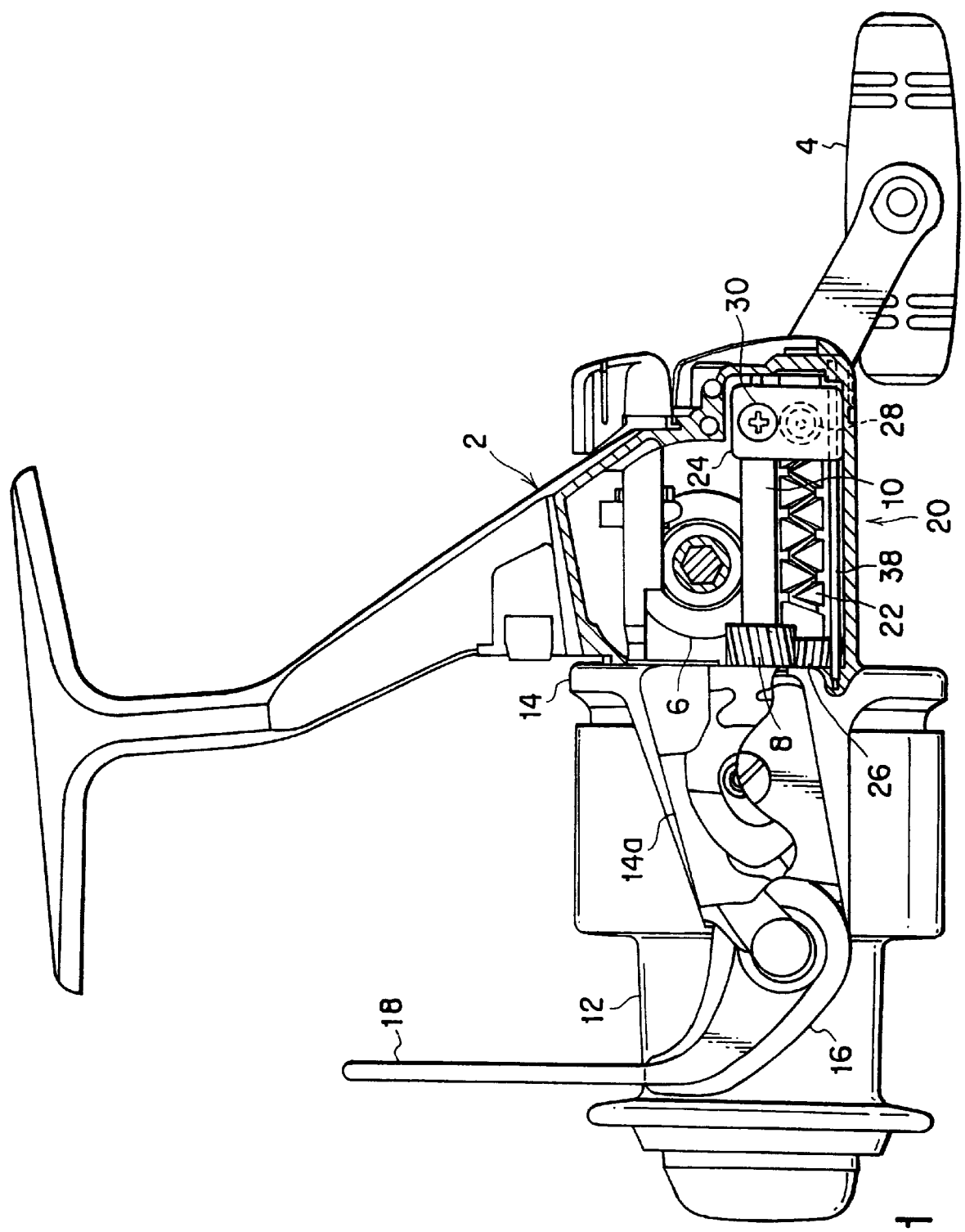
FIG. 1 is a view showing the structure of a fishing reel according to the first embodiment of the present invention.
Figure 2A:
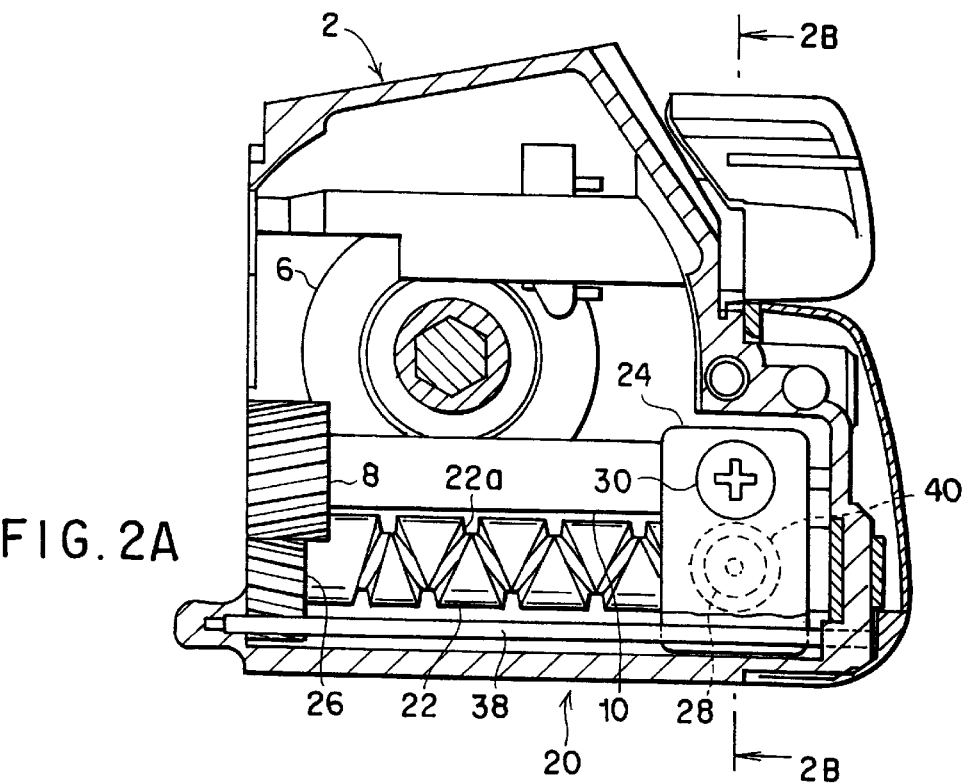
FIG. 2A is an enlarged view of an oscillating mechanism.
Figure 2B:
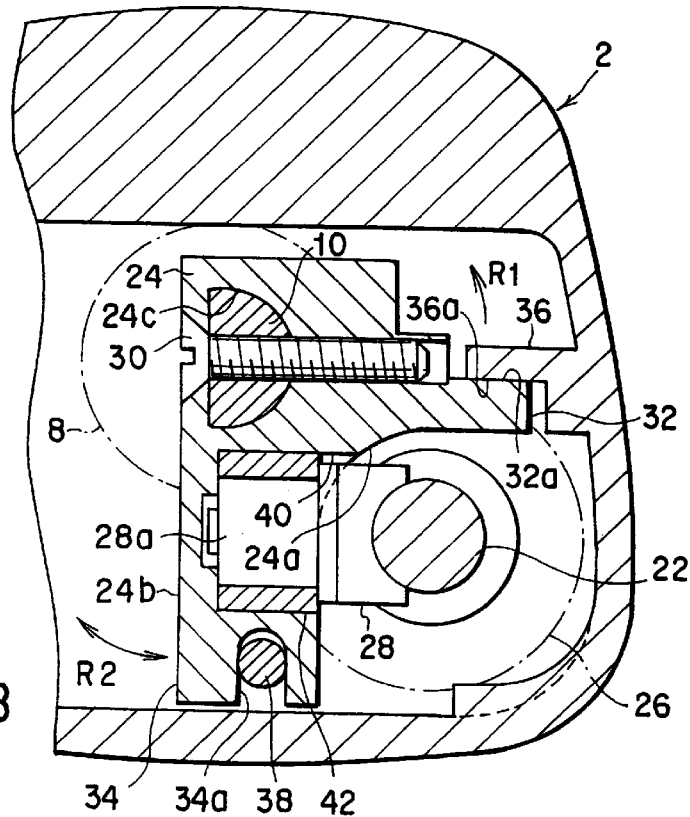
FIG. 2B is a cross sectional view taken along the line 2B—2B in FIG. 2A.
Figure 3:
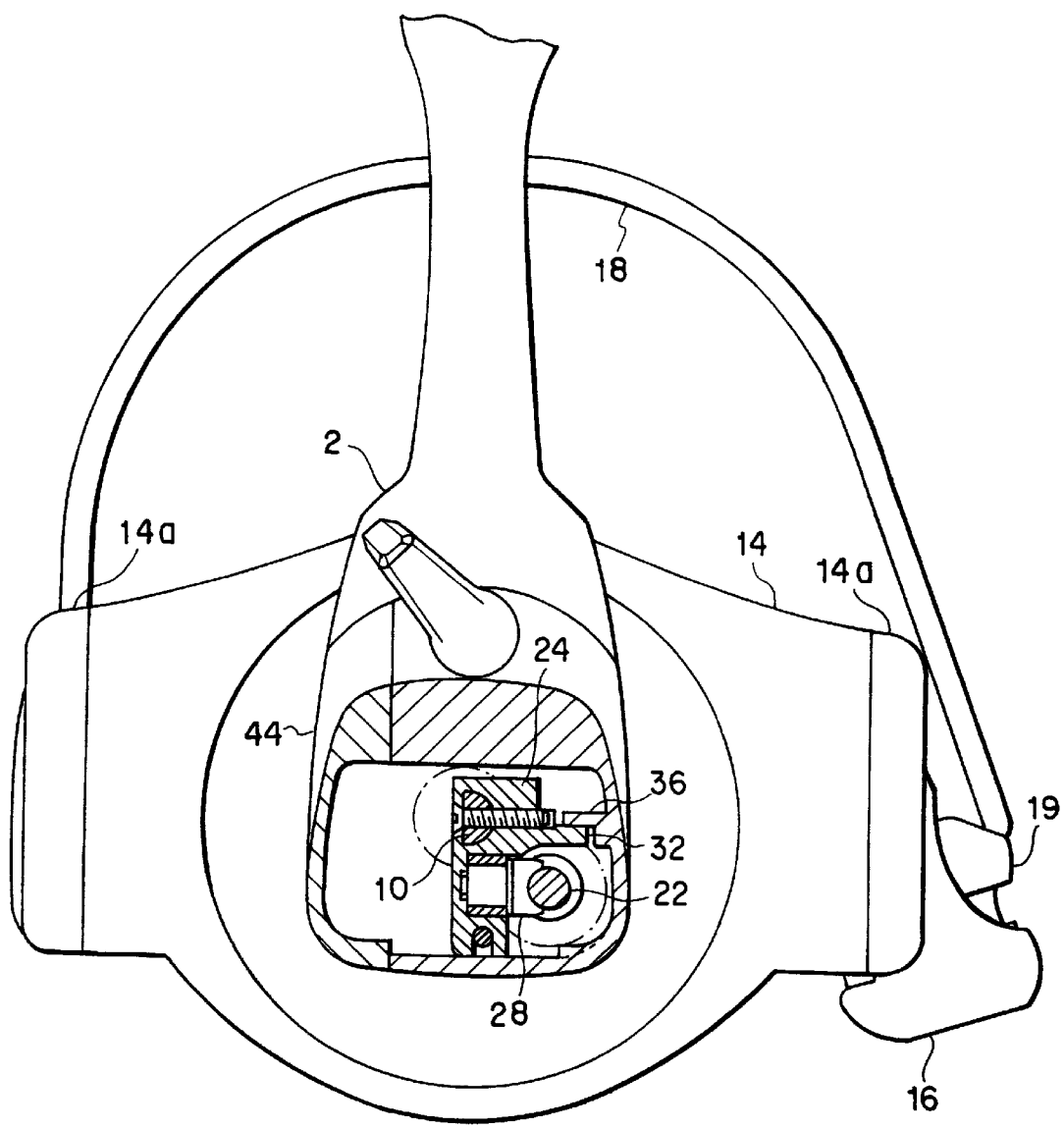
FIG. 3 is a cross sectional view taken along the line A—A in FIG. 2A as the fishing reel shown in FIG. 1 is viewed from back.

FIGS. 1 to 3 show the first embodiment of the present invention. As can be seen in FIG. 1, a drive gear 6 rotated by a handle 4 as it is rotated is provided in a reel main body 2 of a fishing spinning reel of this embodiment. With the drive gear 6, a hollow pinion 8 is engaged. The pinion 8 is supported rotatably by the reel main body 2 by means of a bearing (not shown).

In the pinion 8, a spool shaft 10 is put through in the axial direction, and a spool 12 around which a fish line (not shown) is wound, is mounted at a tip end of the spool shaft 10.

Further, a rotor 14 which rotates together with the pinion 8 is provided with the pinion 8, and a pair of bail mounting arms 14a are provided with the rotor 14. Bail 18 is supported on these bail mounting arms 14a rotatably between a fishing line releasing state and a line winding state respectively via swing arms 16. It should be noted that a fish line guide mechanism (line roller) 19 (see FIG. 3) is supported between one of the swing arms 16 and an end portion of the bail 18.

An oscillating mechanism 20 is engaged with the drive gear 6, and with the mechanism, the spool shaft 10 can be moved back and forth as the drive gear 6 is rotated by operating the handle 4.

The oscillating mechanism 20 includes a traverse cam shaft 22 arranged to be in parallel with the spool shaft 10 and supported rotatably by the reel main body 2 via a bearing (not shown), and a slider member 24 fixed at a rear end of the spool shaft 10 and made slidable in back-and-forth direction along the traverse cam shaft 22.

The traverse cam shaft 22 is connected to the pinion 8 via a gear 26, whereas an engagement pin 28 which engages with the traverse cam shaft 22 at all times is provided on the slider member 24. The slider member 24 is fixed to the rear end of the spool shaft 10 by means of a stopper screw 30. A fixation hole 24c (see FIG. 2B) having an identical shape to the outer shape of the rear end of the spool shaft 10 is made through the slider member 24. As the rear end of the spool shaft 10 is inserted to the fixation hole 24c and the stopper screw 30 is tightened, the slider member 24 is fixed to the rear end of the spool shaft 10.

With the above-described oscillating mechanism 20, as the pinion 8 is rotated by means of the drive gear 6 by operating the handle 4, the gear 26 which is engaged with the pinion 8 is rotated, and accordingly the traverse cam shaft 22 is rotated along with the rotation of the gear 26. At the same time, as the engagement pin 28 which is set engaged with the traverse cam shaft 22 moves back and forth along with the rotation of the traverse cam shaft 22, the slider member 24 moves back and forth along the traverse cam shaft 22. As a result, the spool shaft 10 which is connected to the slider member 24 via the stopper screw 30 can be moved back and forth.

In the fishing spinning reel having the above-described structure, when the handle 4 is rotated, the rotation movement is transmitted to the pinion 8 via the drive gear 6, thus rotating the rotor 14. At the same time, the rotation movement of the handle 4 is transmitted to the spool shaft 10 via the oscillating mechanism 20, thus moving the spool shaft 10 back and forth. As the spool 12 moves back and forth as the rotor 14 rotates, the fishing lien is wound evenly on the spool 12 without being one-sided, by means of the fishing line guide mechanism 19.

Further, the fishing spinning reel of this embodiment is equipped with a rattling preventing mechanism for suppressing the occurrence of rattling of the slider member 24 of the oscillating mechanism 20, and another mechanism for facilitating the assembly of the oscillating mechanism 20 to the reel main body 2.

As can be seen from FIGS. 2A and 2B, the slider member 24 of the oscillating mechanism 20 applied to the present embodiment is not designed to cover the entire circumference of the traverse cam shaft 22, but it is formed to oppose a part of the entire circumference of the traverse cam shaft 22. More specifically, in the slider member 24, an opposing section 24a which opposes a part of the entire circumference of the traverse cam shaft 22 is formed to be integrated with the member. Further, as the rattling preventing mechanism, the slider member 24 is equipped with a guide support unit 32 formed continuously in one direction from the opposing section 24a, and an engagement guide unit 34 formed continuously in another direction from the opposing section 24a.

The guide support unit 32 is projecting out in a lateral direction towards the reel main body 2. On a section of the reel main body 2 which is on the projecting end side of the guide support unit 32, a main body side support unit (guide member) 36 for guiding the guide support unit 32 is provided along the traverse cam shaft 22 as the rattling preventing mechanism. The main body side support unit 36 projects out towards the guide support unit 32 from the reel main body 2, and an abut surface 36a to which a guide surface 32a of the guide support unit 32 can be abutted, is formed on its projecting end portion of the main body side support unit 36. The guide surface 32a and the abut surface 36a are both finished to have smooth surfaces. Therefore as the guide surface 32a is being abutted to the abut surface 36a, the guide support unit 32 can be guided smoothly along the main body side support unit 36, without rattling in a direction indicated by arrow R1.

Meanwhile, the engagement guide unit 34 projects downwards towards the reel main body 2, and an opening section which is opened in a predetermined shape, that is, an engagement groove 34a having an approximately U shape, is formed in the projecting end thereof. On a section of the reel main body 2, which is on the projecting end side of the engagement guide unit 34, one guide shaft (guide member) 38 which is engageable with the engagement groove 34a is provided along the traverse cam shaft 22 as the rattle preventing mechanism. The engagement groove 34a and the guide shaft 38 are both finished to have smooth surfaces. Therefore as the engagement groove 34a is being engaged to the guide shaft 38, the guide support unit 34 can be guided smoothly along the guide shaft 38, without rattling in a direction indicated by arrow R2.

With the rattling preventing mechanism, as the slider member 24 is guided at two sections, namely the main body side support unit 36 and the guide shaft 38, as described, the slider member 24 of the oscillating mechanism 20 can be moved back and forth along the traverse cam shaft 22 without having the rattling of the member.

Next, the structure designed to facilitate the assembly of the oscillating mechanism 20 to the reel main body 2 will now be described.

As shown in FIGS. 2A and 2B, a drop-off stopper support unit is formed at the opposing section 24a of the slider member 24 to be integral therewith. The drop-off stopper support unit has such a structure that the engagement pin 28 is supported between the slider member 24 and the traverse cam shaft 22 from being pulled out to drop, when the engagement pin 28 is engaged with the traverse cam shaft 22.

The drop-off stopper support unit applied in this embodiment has a bag-hole shaped container hole 40 having a circular cross section, which is made integral with the opposing section 24a of the slider member 24, so that the container hole can contain the engagement pin 28 and support it by the proximal portion 28a thereof.

More specifically, the container hole 40 of the drop-off stopper support unit is formed opened to only the opposing section 24a side of the slider member 24, and a bottom section of the container hole 40, that is, the other opposing section 24b of the slider member 24 is integrally closed. With this structure, the container hole 40 is capable of removably containing the proximal portion 28a of the engagement pin 28 from the opposing section 24a of the slider member 24, and therefore as the proximal portion 28a is contained in the container hole 40, the proximal portion 28a is supported by the container hole 40 so that it will not be pulled out. In this manner, the engagement pin 28 can be supported between the slider member 24 and the traverse cam shaft 22 so that it will not drop off.

It should be noted here that the other opposing section 24b of the slider member 24 is a section located on an opposite side to the opposing section 24a of the slider member 24, and it is a section which opposes a cover 44, which will be later explained (See FIG. 3).

In the meantime, when the slider member 24 is moved back and forth along the traverse cam shaft 22, the engagement pin 28 changes its slope angle along the spiral cam groove 22a formed in the traverse cam shaft 22 while it moving back and forth along the groove, and therefore the engagement pin 28 rotates by a predetermined amount. Thus, in order to smoothly rotate the engagement pin 28, the inner diameter size of the container hole 40 and the outer diameter size of the proximal portion 28a of the engagement pin 28 should preferably be adjusted with respect to each other.

In this case, it is alternatively possible as shown in FIG. 2B, that a collar member 42 is provided on an outer circumference of the proximal portion 28a of the engagement pin 28, so as to house the proximal portion 28a of the engagement pin 28 into the container hole 40 via the collar member 42.

Here, one example of method of building the oscillating mechanism 20 into the reel main body 2 will now be described.

First, before the spool shaft 10 is inserted to the reel main body 2 to be mounted, the proximal portion 28a of the engagement pin 28 is inserted to the container hole 40 from the opposing section 24a side of the slider member 24. Then, the engagement pin 28 is lightly engaged with the spiral cam groove 22a of the traverse cam shaft 22. At the same time, the guide surface 32a of the guide support unit 32, which projects in the lateral direction from the slider member 24 is abutted to the abut surface 36a of the main body side support unit 36, which projects from the reel main body 2. Further, the engagement groove 34a of the engagement guide unit 34, which projects downwards from the slider member 24, is made engaged with the guide shaft 38 provided in the reel main body 2.

Next, the spool shaft 10 is inserted to the reel main body 2. Here, the rear end of the spool shaft 10 is inserted to the fixation hole 24c of the slider member 24, and while maintaining the insertion state, the stopper screw 30 is used to tighten it from the other opposite portion 24b side of the slider member 24. Thus, the slider member 24 is fixed to the rear end of the spool shaft 10.

As a result of the above-described process, the engagement pin 28 is tightly engaged with the spiral cam groove 22a of the traverse cam shaft 22 while the proximal portion 28a of the pin is supported by the container hole 40 so that it will not be pulled out. After that, the cover 44 (see FIG. 3) is mounted on the reel main body 2, and thus the oscillating mechanism 20 is contained in the reel main body 2 while it is shielded from outside with the cover 44. When the oscillating mechanism 20 is operated in practice, the slider member 24 moves back and forth along the traverse cam shaft 22 as it is guided by two locations of the main body side support unit 36 and the guide shaft 38. In this manner, it becomes possible to move the slider member 24 back and forth without rattling.

As described above, according this embodiment, the drop-off stopper support unit (container hole 40) for supporting the engagement pin 28 between the slider member 24 and the traverse cam shaft 22 not to drop off therefrom, is formed integrally in the opposing section of the slider member 24. With this structure, the number of parts of the slider member 24 can be reduced as compared to the conventional technique. Further, since the engagement pin 28 can be set supported not to be pulled out, between the slider member 24 and the traverse cam shaft 22, merely by housing the proximal portion 28a of the engagement pin 28 in the drop-off stopper support unit (container hole 40), the number of steps of the building-in process of the oscillating mechanism 20 to the real main body 2 can be reduced, thus making it possible to facilitate the assembly. As these advantages create a synergetic effect, a fishing reel having a low-cost oscillating mechanism 20 is realized.

Apart from the above, according to the present embodiment, the drop-off stopper support unit (container hole 40) is formed integrally in the opposing section 24a of the slider member 24 and the other opposing section 24b of the slider member 24 is made closed integrally with the member, thus the strength of the slider member 24 can be increased. As a result, the engagement accuracy between the engagement pin 28 and the spiral cam groove 22a of the traverse cam shaft 22 is improved so that the slider member 24 can be moved back and forth along the traverse cam shaft 22 smoothly without nonuniformity.

Furthermore, according to this embodiment, the slider member 24 can be formed without requiring a separate material such as a stopper plate as in conventional cases, and therefore the rattling preventing mechanism described above can be provided at high accuracy with a high degree of freedom in terms of space.

Figure 4A:
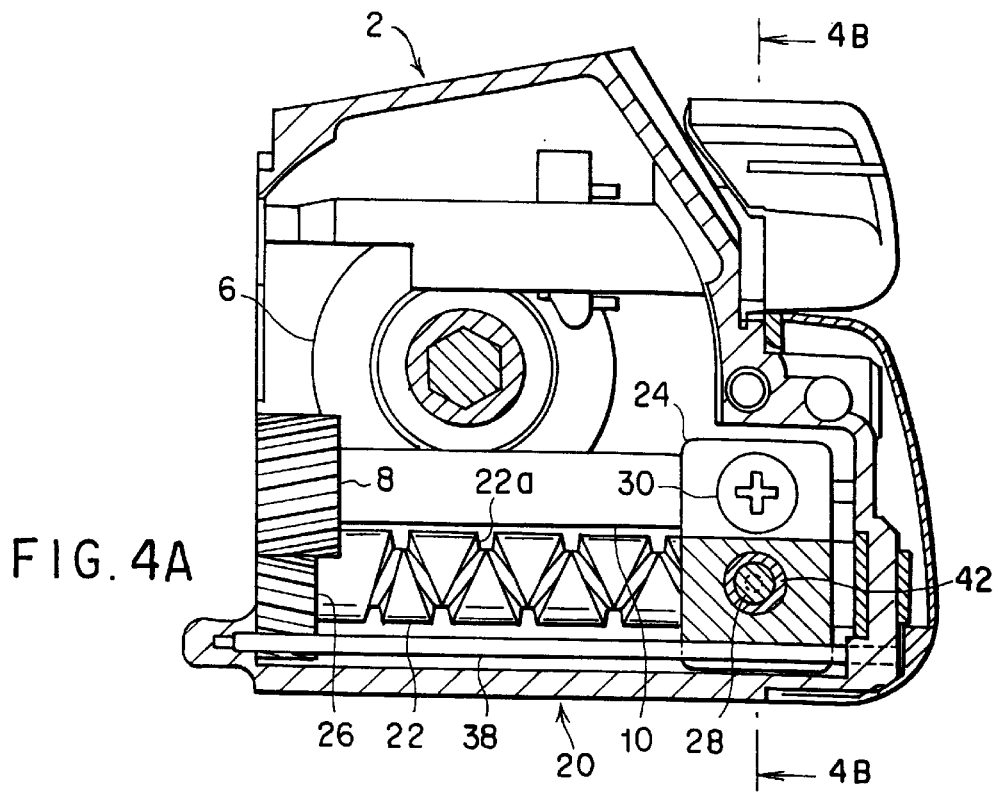
FIG. 4A is an enlarged view of an oscillating mechanism of a fishing reel according to the second embodiment of the present invention.
Figure 4B:
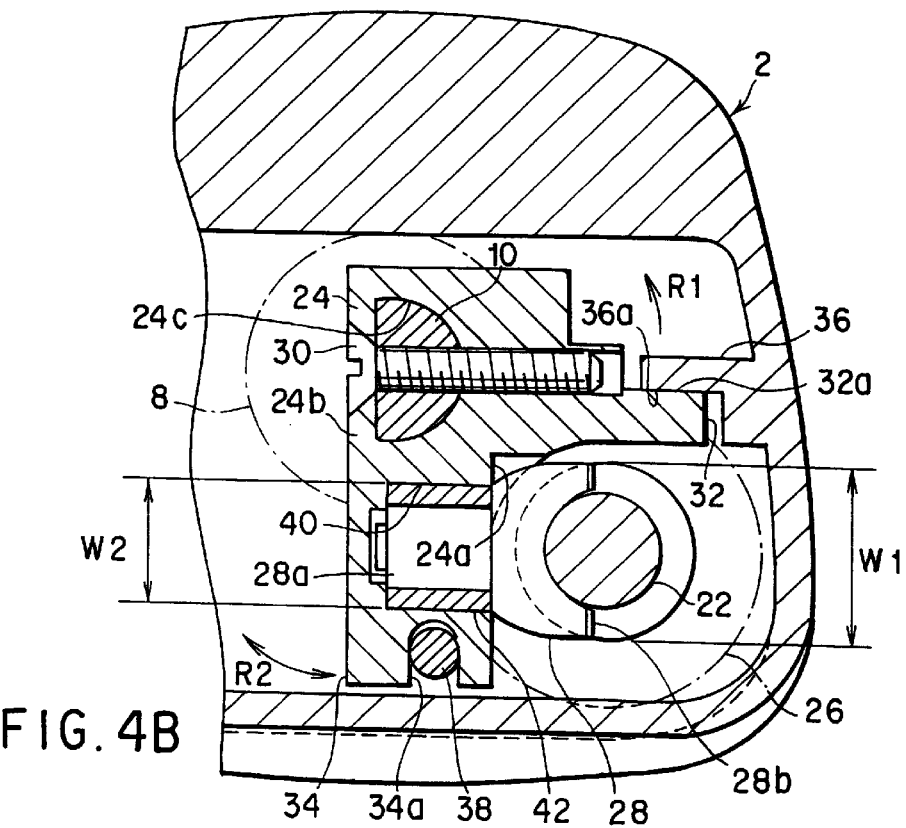
FIG. 4B is a cross sectional view taken along the line 4B—4B in FIG. 4A.

FIGS. 4A and 4B show the second embodiment of the present invention. This embodiment is an alternative version of the first embodiment, and it is different from the first embodiment only in that a structure designed to improve the operability of the oscillating mechanism 20 by increasing the engagement amount between the engagement pin 28 and the traverse cam shaft 22, and at the same time, designed to downsize the reel as a whole is added to this embodiment. Under these circumstances, only aspects which are different from those of the first embodiment will be discussed in the following description. In the description, the same structural elements as those of the first embodiment are designated by the same reference numerals, and explanations therefor will not be repeated.

As can be seen in FIGS. 4A and 4B, a hollow cylindrical collar member 42 which serves as a bearing is provided for an outer circumference of a circular cylindrical proximal portion 28a of the engagement pin 28, and thus the proximal portion 28a is structured to include the collar member 42. With this structure, as the proximal portion 28a of the engagement pint 28 is housed into the container hole 40 via the collar member 42, the engagement pin 28 can be supported between the slider member 24 and the traverse cam shaft 22 so that it will not be pulled out.

In order to enhance the operability of the oscillating mechanism 20 by increasing the engagement amount between the engagement pin 28 and the traverse cam shaft 22, the outer diameter size of the traverse cam shaft 22 is increased, and a tooth width W1 of a tooth section 28b of the engagement pin 28, which engages with the spiral cam groove 22a of the traverse cam shaft 22 is increased at a corresponding enlarging rate to that of the cam shaft 22. With this structure, in order to maintain the mechanical strength and durability of the slider member 24 in which the container hole 40 is made to contain the proximal portion 28a of the engagement pin 28 and to prevent the enlargement of the size of the entire slider member 24, the tooth width W1 of the tooth portion 28b of the engagement pin 28 and an inner circumferential diameter W2 of the container hole 40 of the slider member 24 are set to satisfy the following relationship: W1>W2 in this embodiment.

As described above, according to this embodiment, the same advantage as that of the first embodiment can be obtained. Further, in addition, since the engagement amount between the engagement pin 28 and the traverse cam shaft 22 is increased by enlarging the tooth width W1 of the engagement pin 28, at a corresponding rate to the enlargement rate of the outer diameter size of the traverse cam shaft 22, the operability of the oscillating mechanism 20 can be improved. At the same time, in this embodiment, the tooth width W1 of the tooth portion 28b of the engagement pin 28 and the inner circumferential diameter W2 of the container hole 40 of the slider member 24 are set to satisfy the following relationship: W1>W2, and therefore it becomes possible to maintain a high strength and durability without enlarging the size of the slider member 24 as a whole. Consequently, the downsizing of the entire reel can be realized.

More specifically, in a limited space of the reel main body 2, the engagement amount between the engagement pin 28 and the traverse cam shaft 22 (that is, the radius of curvature of the tooth portion 28b of the engagement pin 28 which engages with the traverse cam shaft 22) can be increased while achieving the downsizing of the oscillating mechanism 20 (especially, the downsizing of the slider member 24). Therefore, the rotatability of the traverse cam shaft 22 and the slidability of the engagement pin 28 can be both improved. Consequently, the slider member 24 can be moved back and forth along the traverse cam shaft 22 stably and smoothly while preventing one-sided abutting between the engagement pin 28 and the traverse cam shaft 22, creation of noise, and the like.

Further, according to the second embodiment (similar to the first embodiment), the slider member 24 is not designed to cover the entire circumference of the traverse cam shaft 22, but is structured so that the opposing portion 24a opposing a part of the entire circumference of the traverse cam shaft 22 is integrated to the slider member 24. In other words, the slider member 24 has a section opposing the traverse cam shaft 22, which is widely opened, and therefore the weight of the slider member 24 can be decreased. As a result, the operability in fishing can be further improved.

Figure 5A:
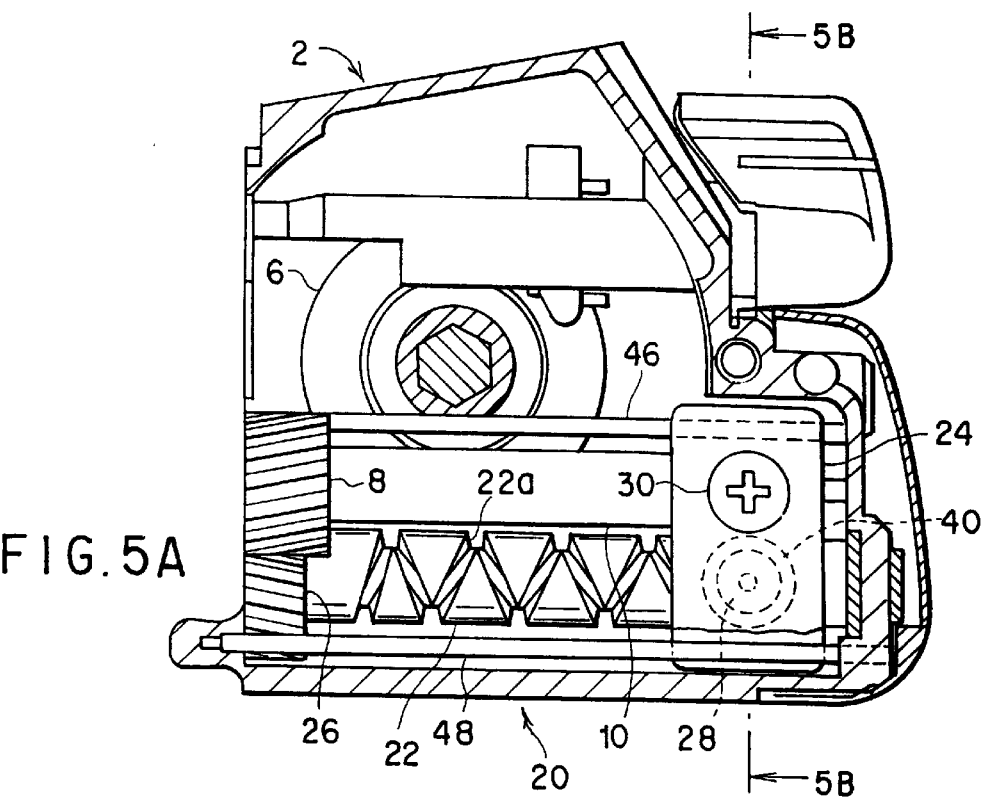
FIG. 5A is an enlarged view of an oscillating mechanism of a fishing reel according to the third embodiment of the present invention.
Figure 5B:
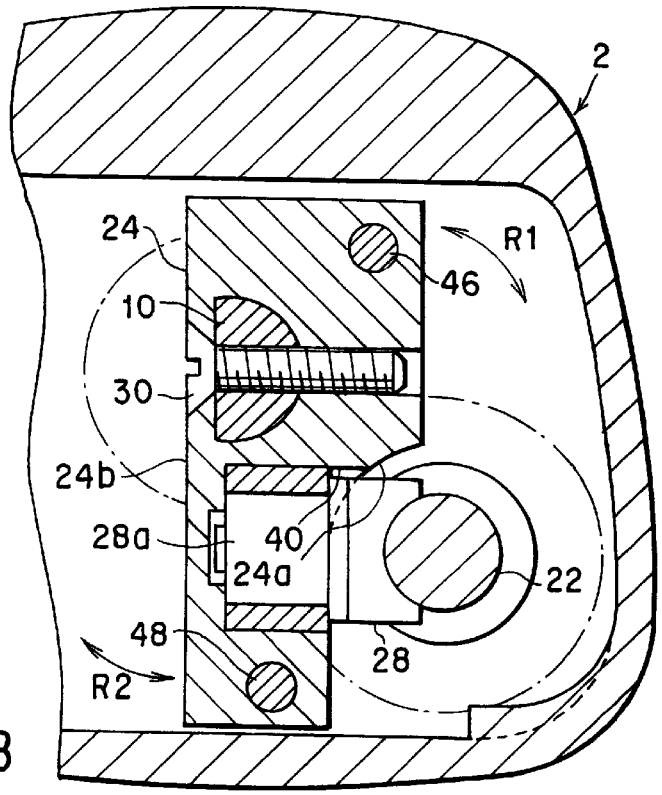
FIG. 5B is a cross sectional view taken along the line 5B—5B in FIG. 5A.

FIGS. 5A and 5B show the third embodiment of the present invention. This embodiment is an alternative version of the first embodiment. Under these circumstances, only aspects which are different from those of the first embodiment will be discussed in the following description. In the description, the same structural elements as those of the first embodiment are designated by the same reference numerals, and explanations therefor will not be repeated.

In this embodiment, in place of providing the guide support unit 32 and engagement guide unit 34, for example, two shafts, namely, first and second guide shafts (guide members) 46 and 48 are provided as can be seen in FIGS. 5A and 5B. With these guide shafts 46 and 48, the occurrence of the rattling of the slider member 24 is suppressed.

The first guide shaft 46 is put through an upper section of the slider member 24 and provided in the reel main body 2 along the traverse cam shaft 22, whereas the second guide shaft 48 is put through a lower section of the slider member 24, and provided in the reel main body 2 along the traverse cam shaft 22.

With this rattling preventing mechanism, the slider member 24 can move back and forth along the traverse cam shaft 22 while rattling which may occur in the direction indicated by arrow R1 is avoided by the first guide shaft 46, and at the same time, it can move back and forth along the traverse cam shaft 22 while rattling which may occur in the direction indicated by arrow R2 is avoided by the second guide shaft 48.

Figure 6:
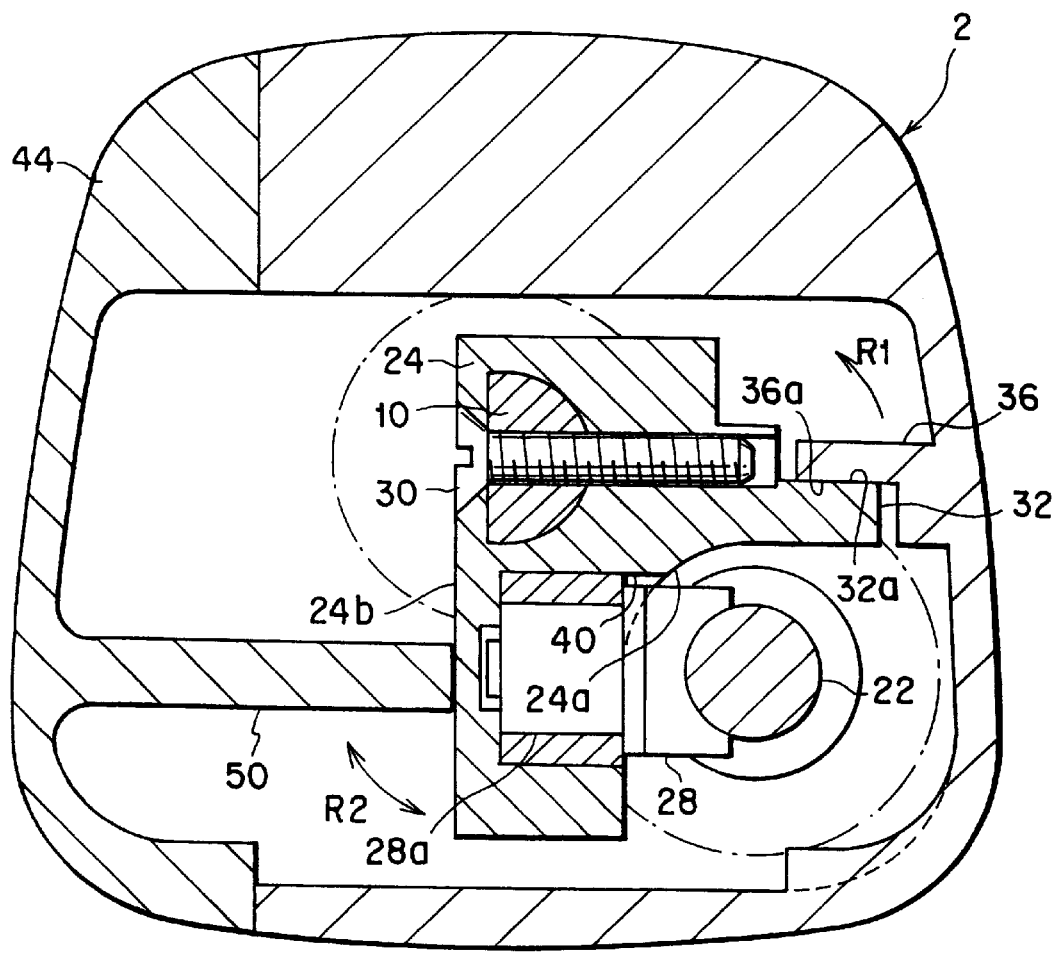
FIG. 6 is a cross sectional view showing the main portion of a fishing reel according to the fourth embodiment of the present invention.

FIG. 6 shows the fourth embodiment of the present invention. This embodiment is an alternative version of the first embodiment. Under these circumstances, only aspects which are different from those of the first embodiment will be discussed in the following description. In the description, the same structural elements as those of the first embodiment are designated by the same reference numerals, and explanations therefor will not be repeated.

In this embodiment, in place of providing the engagement guide unit 34, for example, a rattling preventing projection unit (guide member) 50, which projects from the cover 44 towards the other opposing section 24b of the slider member 24 is provided as can be seen in FIG. 6. With the rattling preventing projection unit 50, the guiding support unit 32 and the main body side support unit 36, the occurrence of the rattling of the slider member 24 is suppressed.

The rattling preventing projection unit 50 is formed to have a structure in which it extends along the traverse cam shaft 22, and the tip end thereof is situated to abut the other opposing section 24b of the slider member 24 when the cover 44 is mounted on the reel main body 2. With this rattle preventing mechanism, as the guide surface 32a of the guide support unit 32 is made to abut on the abut surface 36a of the main body side support unit 36, the slider member 24 can move back and forth along the traverse cam shaft 22 while preventing the rattling of the member in the direction indicated by arrow R1. Meanwhile, as the rattle preventing projection unit 50 abuts on the other opposing section 24*b*, the slider member 24 moves back and forth along the traverse cam shaft 22 while preventing rattling in the direction indicated by arrow R2.

Figure 7A:
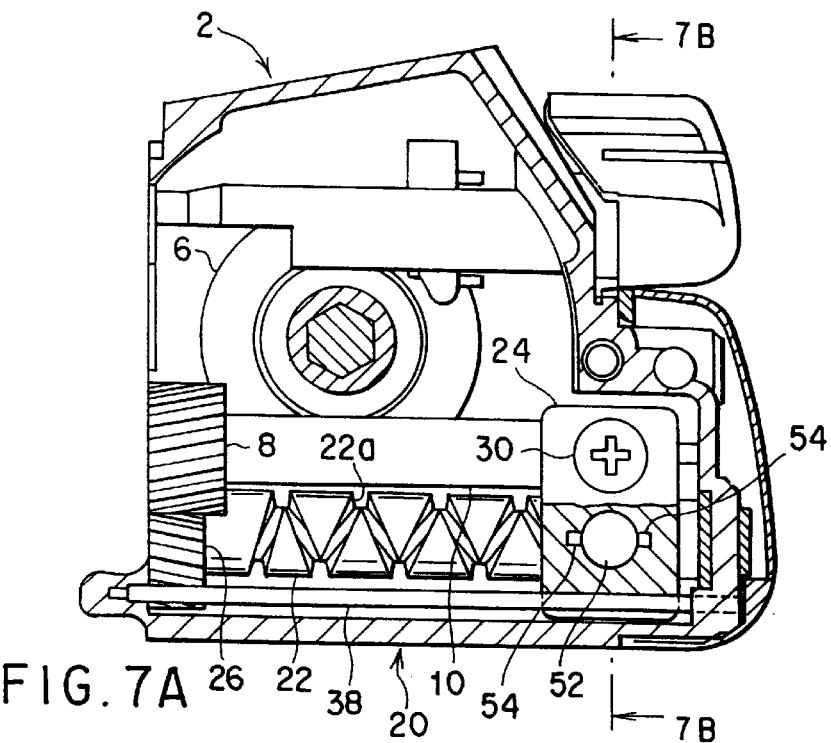
FIG. 7A is an enlarged view of an oscillating mechanism of a fishing reel according to the fifth embodiment of the present invention.
Figure 7C:
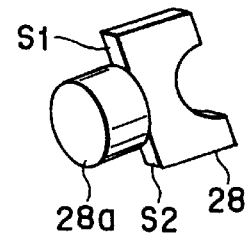
FIG. 7C is a perspective view showing an engagement pin according to the fifth embodiment.
Figure 7B:
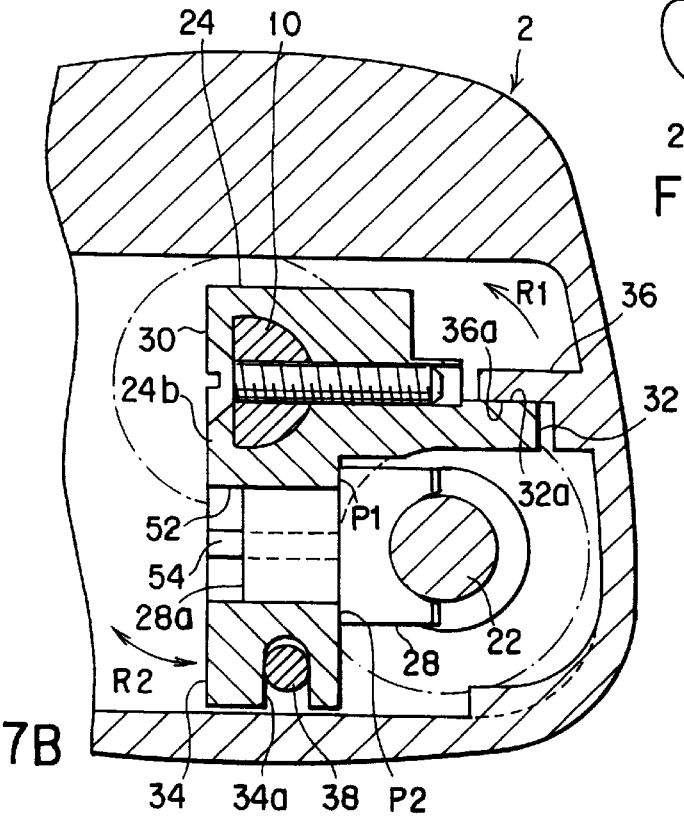
FIG. 7B is a cross sectional view taken along the line 7B—7B in FIG. 7A.

FIGS. 7A to 7C show the fifth embodiment of the present invention. This embodiment is an alternative version of the first embodiment. Under these circumstances, only aspects which are different from those of the first embodiment will be discussed in the following description. In the description, the same structural elements as those of the first embodiment are designated by the same reference numerals, and explanations therefor will not be repeated.

In this embodiment, a drop-off stopper support unit includes stopper support pieces P1 and P2 provided as integral units and projecting from the opposing portion 24*a* of the slider member 24. The tip end of the engagement pin 28 is shaped into plate forms made larger than the circular cylindrical proximal portion 28*a* as shown in FIG. 7C. The enlarged sections of the engagement pin 28, which have plate-like forms, (specifically, the section opposing the proximal portion 28*a* side) S1 and S2 are made to abut on the drop-off stopper support pieces P1 and P2 of the opposing portion 24*a*. In this manner, it is possible to support the engagement pin 28 between the slider member 24 and the traverse cam shaft 22 such that it will not drop off as in the above-described embodiments. (See FIG. 7B).

In this embodiment, the plug-in direction of the engagement pin 28 to the slider member 24 is made different from those of the embodiments described above. More specifically, in the above-described embodiments, the engagement pin 28 is plugged into the slider member 24 from the opposing portion 24*a* side, whereas in this embodiment, it is plugged into the slider member 24 from the other opposing portion 24*b* side. Therefore, in the slider member 24 of this embodiment, a plug-in hole (container hole) 52 is made from the other opposing portion 24*b* towards the opposing portion 24*a* in the direction perpendicular to the traverse cam shaft 22. The plug-in hole 52 has an inner surface shape which substantially matches the outer shape of the circular cylindrical proximal portion 28*a*, so that the proximal portion 28*a* can smoothly rotate without rattling.

Further, in an inner circumferential surface of the plug-in hole 52, a pair of groove sections 54 arranged to oppose to each other are made. The distance between these opposing groove sections 54 is approximately the same as the width of the enlarged tip end of the engagement pin 28, which is shaped into plates, and the groove width of these groove sections 54 is made substantially the same as thickness of the plate-shaped tip end of the engagement pin 28.

In an actual plug-in process, for example, while the proximal portion 28*a* is supported, the engagement pin 28 is inserted to the plug-in hole 52 made in the other opposite portion 24*b* of the slider member 24. During this operation, it is inserted while the enlarged portions S1 and S2 of the engagement pin 28, which are enlarged into plate-like shapes, are made to match a pair of the groove sections 54. Then, as the engagement pin 28 inserted from the other opposing portion 24*b* is completely through to the opposing portion 24*a* side, the proximal portion 28*a* is slightly rotated. In this manner, the enlarged portions S1 and S2 of the engagement pin 28 can be made abut on the drop-off stopper support pieces P1 and P2. The assembly process from here onwards is the same as that of the first embodiment, and therefore the explanation will be omitted here.

It should be noted here that the present invention is not limited to the above-described embodiments, but as long as the essence of the invention remains, it may be remodeled into various versions. More specifically, the above embodiments are described in connection with the case of a spinning reel in which the slider member 24 is fixed by means of a screw to the rear end of the spool shaft 10. However, the present invention can be applied to a rear-drag-type spinning wheel in which a slider member is fixed to the rear portion of the conventional spool shaft to be rotatable but immovable in the axial direction, or a double-bearing-type reel in which an engagement pin is held in the slider member of a fish line parallel winding device provided in from of the spool shaft between the side plates of the reel main body, or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fishing reel comprising:

a reel main body equipped with a rotatable handle;

a spool supported by the reel main body and configured to wind a fishing line therearound;

an oscillating mechanism provided in the reel main body, and having a traverse cam shaft which rotates as it cooperates with the handle, and has a circumferential surface in which a spiral cam groove is formed, and a slider member containing and supporting an engagement pin which engages with the cam groove of the traverse cam shaft, so as to move back and forth along an axial direction of the traverse cam shaft, said oscillating mechanism winding the fishing line on the spool in parallel by converting the rotating movement of the handle into a back and forth motion via the slider member;

an opposing section formed integrally with the slider member, which opposes a part of an entire circumference of the traverse cam shaft; and a drop-off stopper support unit formed integrally with the opposing section and configured to support the engagement pin between the slider member and the traverse cam shaft so as to prevent it from being pulled out;

wherein the drop-off stopper support unit is constituted by a container hole made in the slider member to have one side opened in the opposing section and to be capable of containing the engagement pin detachably, and at least one support piece provided to project from the opposing section of the slider member; and wherein the engagement pin has a proximal portion inserted in the container hole, and an enlarged portion having a width larger than that of the proximal portion and projecting outside of the container hole to abut on the support piece.

2. A fishing reel according to claim 1, wherein the container hole has another side opened in another opposing section of the slider member, located on an opposite side to the opposing section, and has a groove through which the enlarged portion of the engagement pin can be put.

3. A fishing reel according to claim 2, wherein the engagement pin is contained in the container hole from the other opposing section side of the slider member.

4. A fishing reel comprising:

a reel main body equipped with a rotatable handle;

a spool supported by the reel main body and configured to wind a fishing line therearound;

an oscillating mechanism provided in the reel main body, and having a traverse cam shaft which rotates as it cooperates with the handle, and has a circumferential surface in which a spiral cam groove is formed, and a slider member containing and supporting an engagement pin which engages with the cam groove of the traverse cam shaft, so as to move back and forth along an axial direction of the traverse cam shaft, said oscillating mechanism winding the fishing line on the spool in parallel by converting the rotating movement of the handle into a back and forth motion via the slider member, an opposing section formed integrally with the slider member, which opposes a part of an entire circumference of the traverse cam shaft; and a drop-off stopper support unit formed integrally with the opposing section and configured to support the engagement pin between the slider member and the traverse cam shaft so as to prevent it from being pulled out;

wherein the engagement pin has a proximal portion contained in the slider member, and a tooth portion which engages with the cam groove of the traverse cam shaft;

wherein the drop-off stopper support unit has a container hole made to be capable of containing the proximal portion of the engagement pin; and wherein a tooth width of the tooth portion of the engagement pin is larger than an inner diameter of the container hole.

* * * * *